UNITED STATES PATENT OFFICE.

LEWIS E. SAUNDERS AND RAY HILL WHITE, OF NIAGARA FALLS, NEW YORK, ASSIGNORS TO NORTON COMPANY, OF WORCESTER, MASSACHUSETTS, A CORPORATION OF MASSACHUSETTS.

ALUMINOUS ABRASIVE AND METHOD OF PREPARING THE SAME.

1,240,491.  Specification of Letters Patent.  Patented Sept. 18, 1917.

No Drawing.  Application filed February 12, 1917. Serial No. 148,266.

*To all whom it may concern:*

Be it known that we, LEWIS E. SAUNDERS and RAY HILL WHITE, citizens of the United States, residing at Niagara Falls, in the county of Niagara and State of New York, have invented certain new and useful Improvements in Aluminous Abrasives and Methods of Preparing the same, of which the following is a specification.

This invention relates to aluminous abrasives which in their commercial form are products of an electric furnace operation, and to methods of making such abrasives, the invention comprising a novel electric furnace product prepared by adding zirconia or certain compounds thereof to bauxite or equivalent impure aluminous ores, the charge being then fused in the electric furnace and subsequently cooled either in the furnace or after removal therefrom.

In a concurrent application, Serial No. 148,265, we have described and broadly claimed certain products containing the oxids of aluminum and zirconium, irrespective of the association or combination therewith of other oxids, including oxids of silicon, titanium and iron. In said application, we have also claimed specifically such products consisting exclusively or essentially of the oxids of aluminum and zirconium. Products of this latter class, when containing the oxids in the proportion best adapted for abrasive use, exist as a finely granular crystalline mass the particles of which have a marked tendency to crystal development and exhibit the characteristic property of breaking under compression or impact into a large number of relatively small particles of approximately uniform size,—a property which renders the material well adapted for such purposes as the grinding, polishing and cutting of glass.

We have found that when zirconia is added to bauxite and the resulting mixture brought to fusion in the electric furnace, the resulting product differs essentially from that above described, the differences being attributable to the modifying influence upon the alumina-zirconia composition of some or all of the normal impurities of the bauxite, the most common of which are silicia, titanium oxid and ferric oxid.

In the manufacture of the aluminous abrasive described, containing appreciable amounts of zirconia, an ordinary bauxite is calcined, mixed if desired with a small proportion of coke sufficient to reduce the major portion of the iron oxid and silica, and to this is added approximately the desired amount of zirconia. It has been found that by the addition of carbon, iron oxid and silica can be reduced to their respective metals before an appreciable amount of zirconia is reduced. As an illustrative example, a calcined bauxite of the following composition was used:—

| | |
|---|---|
| SiO$_2$ | 3.3% |
| Fe$_2$O$_3$ | 8.2% |
| TiO$_2$ | 3.7% |
| Al$_2$O$_3$ | 82.4% |

100 parts of this bauxite was mixed with 3.3 parts of coke and 6 parts of an impure zirconia ore. This mixture was brought to fusion in an electric furnace and thereafter cooled in the furnace itself. The product thus formed contained, in addition to alumina,—

| | |
|---|---|
| Fe$_2$O$_3$ | .34% |
| SiO$_2$ | 1.1 % |
| TiO$_2$ | 2.5 % |
| ZrO$_2$ | 5.0 % |

Analysis of another lot of product made in a similar way, the percentages of constituents of the mixture being different, showed—

| | |
|---|---|
| Fe$_2$O$_3$ | .45% |
| SiO$_2$ | .94% |
| TiO$_2$ | 2.18% |
| ZrO$_2$ | 3.68% |

By the use of varying percentages of coke to the impurities contained in the bauxite, the percentage of the Fe$_2$O$_3$ and the SiO$_2$ in the resulting product can be controlled.

The products thus formed are very dense in appearance, and particles thereof possess a very high relative strength, being in this respect equal or even slightly superior to the very strong product prepared by the fusion of a similar bauxite to which no zirconia has been added. In addition, the particles or grains, as compared with the product from ordinary bauxite, enter into a much firmer union with the ceramic bond used in the manufacture of grinding-wheels, with the result that they are not to an equal degree torn from the face of the wheel under heavy grinding conditions. In other words, the zirconia-containing particles yield a wheel of distinctly harder grade. The material is therefore especially adapted for heavy duty, as for example the operation known as "snagging" of steel castings or the like.

Zirconia additions in amount as small as two to five per cent. are sufficient to produce strongly marked effects of the character indicated above. Either smaller or larger proportions of zirconia may be used.

Inasmuch as silica is a normal constituent of bauxite, it is obvious that the zirconium may be introduced into the charge wholly or partly in the form of the native silicate, zircon, in those cases where no objection exists to increasing to some extent the silica-content of the abrasive.

We claim:—

1. An electric furnace abrasive containing crystalline alumina, in association with the normal impurities of bauxite, and zirconia.

2. An aluminous abrasive containing oxids of silicon and zirconium.

3. An aluminous abrasive containing oxids of silicon, titanium and zirconium.

4. An aluminous abrasive containing oxids of silicon, titanium, iron and zirconium.

5. An abrasive implement comprising grains containing alumina in association with the normal impurities of bauxite and with zirconia, and a ceramic bond for said grains.

6. The method of making an aluminous abrasive containing zirconia, which consists in fusing in the electric furnace a mixture containing bauxite, an ore of zirconium, and carbon, the carbon in insufficient proportion to reduce the zirconia.

In testimony whereof, we affix our signatures.

LEWIS E. SAUNDERS.
RAY HILL WHITE.